United States Patent [19]

Myhre

[11] 4,133,100

[45] Jan. 9, 1979

[54] METHOD OF MAKING DIAPHRAGM OF OPTIMIZED STRESS AND STRAIN DISTRIBUTION

[76] Inventor: Kjell E. Myhre, 941 N. Enterprise Ave., Inglewood, Calif. 90302

[21] Appl. No.: 754,251

[22] Filed: Dec. 27, 1976

[51] Int. Cl.² .......................................... H01C 17/02
[52] U.S. Cl. .............................. 29/610 SG; 156/625; 156/659; 338/4
[58] Field of Search ............... 29/610 SG, 595; 338/4; 156/625, 644, 654, 659

[56] References Cited

U.S. PATENT DOCUMENTS

| | | | |
|---|---|---|---|
| 3,325,761 | 6/1967 | McLellan | 338/4 |
| 3,341,794 | 9/1967 | Stedman | 338/4 |
| 3,739,315 | 6/1973 | Kurtz et al. | 338/4 X |
| 3,909,924 | 10/1975 | Vindasius et al. | 29/610 SG X |
| 3,912,563 | 10/1975 | Tomioka et al. | 156/644 X |
| 3,968,466 | 7/1976 | Nakamura et al. | 338/4 X |
| 4,016,644 | 4/1977 | Kurtz | 29/610 SG X |

*Primary Examiner*—Victor A. DiPalma
*Attorney, Agent, or Firm*—Romney, Schaap, Golant, Scillieri, Disner & Ashen

[57] ABSTRACT

A transducer diaphragm comprising a diaphragm plate with a predetermined pattern of recesses and mesas formed by a chemical etching method to change and/or isolate the expansion and contraction areas of the plate under pressure. In the illustrated embodiment, the pattern includes a central depression on the rearward face including peripheral cutouts extending outwardly from the central depression to receive a strain gauge, thereby positioning the location of the maximum compression amplitude of the diaphragm to be under the gauge.

2 Claims, 13 Drawing Figures

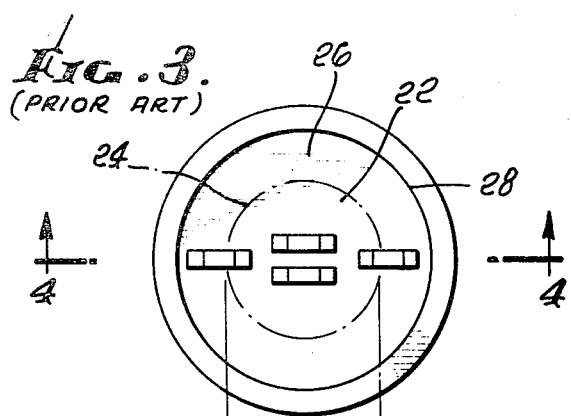
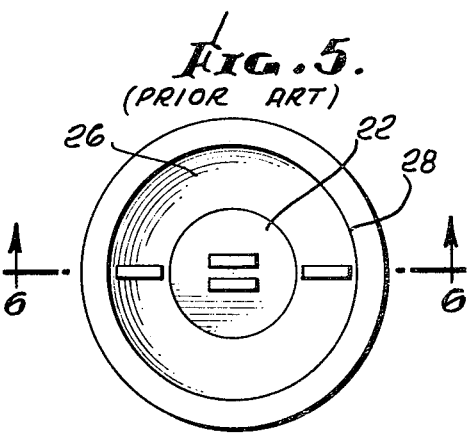
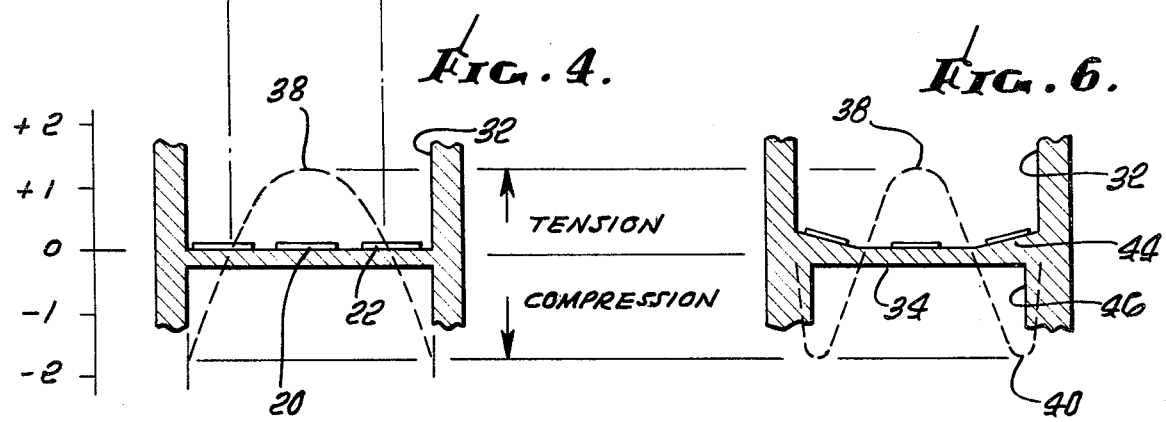
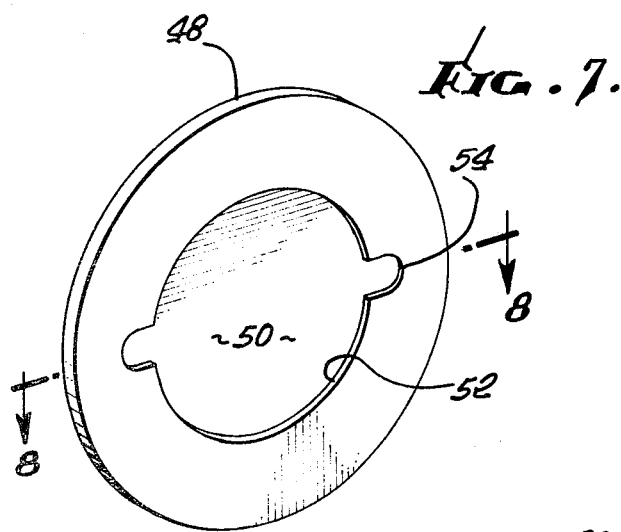
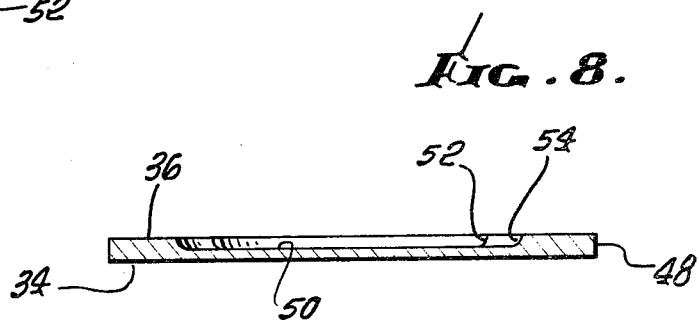

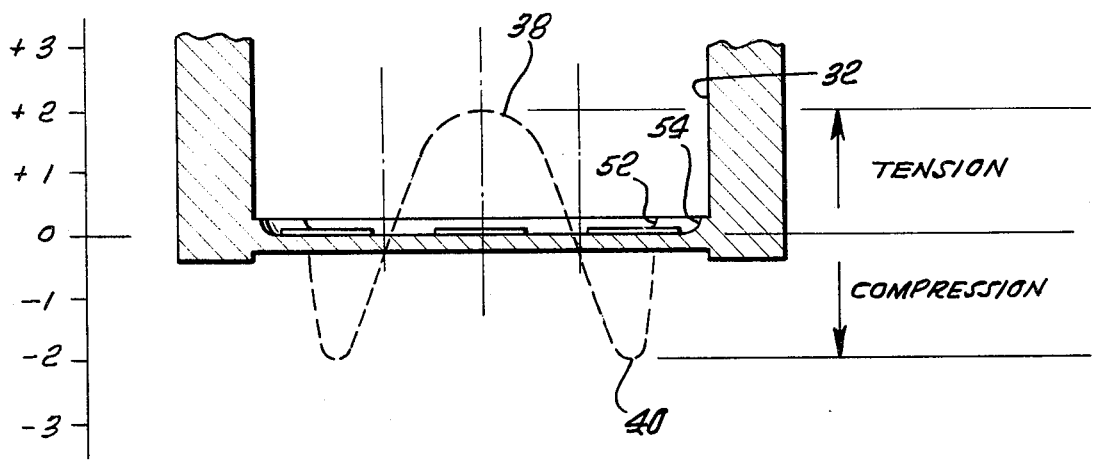
FIG. 11.
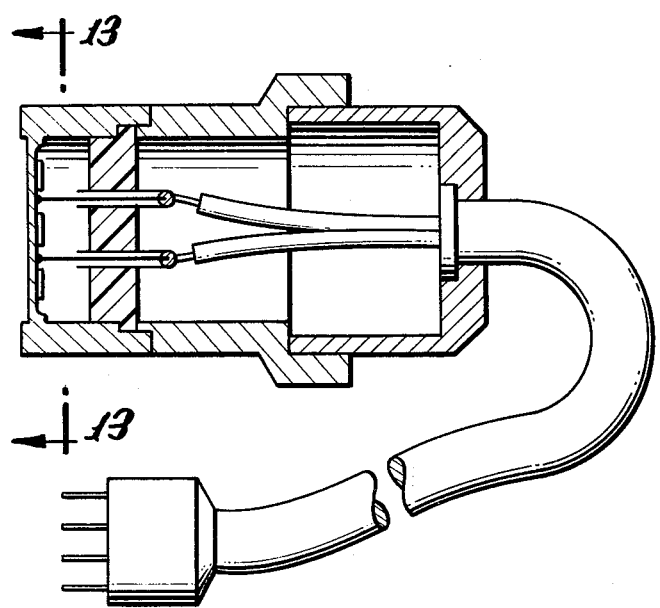
FIG. 12.
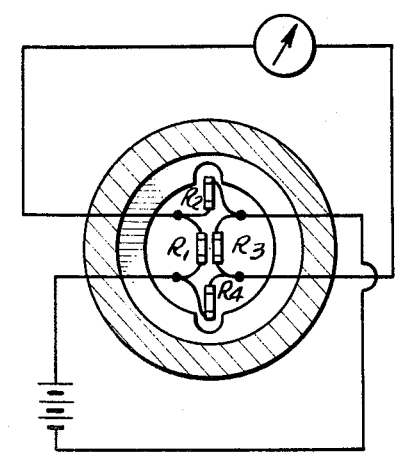
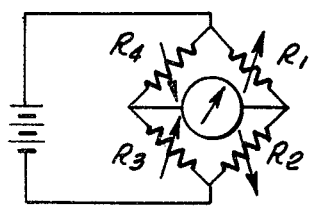
FIG. 13.

METHOD OF MAKING DIAPHRAGM OF OPTIMIZED STRESS AND STRAIN DISTRIBUTION

BACKGROUND OF THE INVENTION

1. Field of the Invention

This invention relates generally to transducer diaphragms and more particularly to the use of chemical etching to create different thickness patterns on the diaphragm plate to change the location of maximum strain amplitude on the plate for monitoring by overlying strain gauges.

2. Description of the Prior Art

Various methods have been employed in the past to improve the performance of strain gauge/diaphragm type pressure transducers, particularly with respect to the location of the strain gauges bonded to the diaphragm to measure the tensile (expansion) and compressive (contraction) strain of the diaphragm when it is subjected to stress in the form of pressure exerted against the diaphragm. Unfortunately, many of such prior manufacturing techniques have become impractical due to the increasing cost of manufacture and the complicated steps that have been employed.

The problem is particularly acute in connection with low pressure/small diameter diaphragm type transducers which incorporated integrally bonded strain gauges on the diaphragms. The size of the gauges and their location on the diaphragm are of primary importance in connection with output/input efficiency, stability/time performance, and the effort to obtain linearity and to minimize hysteresis problems. This is accomplished by placing the center of one or more strain gauges to coincide with the center of the maximum amplitude of the tensile strain locations, and another set of gauges to overlie a corresponding center for maximum amplitude of compressive strains. In the past a primary problem has arisen with the maximum compression amplitude which is typically at the very outer edge of a conventional diaphragm. Those methods which have sought to distribute this maximum compressive strain location inwardly toward the center have invariably added excessively to the cost of the process and are therefore rather impractical, as well as somewhat unreliable.

SUMMARY OF THE INVENTION

Accordingly, it is an object of the present invention to simplify the method of manufacture of diaphragm plates while at the same time altering the strain characteristics of the diaphragm. More specifically, it is an object of the invention to employ chemical milling techniques to etch predetermined designs on one side of the diaphragm.

Another object is to provide a method for chemically etching several hundred diaphragms simultaneously on a single piece of sheet stock. A related object is to etch a central depression on one face of the diaphragm to a thickness half the surrounding thickness of the remaining sheet stock surface.

Another object is to chemically etch the outer edge outline of the diaphragm plate from both sides while etching the central portion from one side so that the completion of the outline etching occurs at the same time the central etching has passed half way through the plate wall.

A related object is to etch the central portion to a first diameter spaced inwardly from the inner wall location of the diaphragm spacer, and to provide cutouts extending into said outer portion to receive strain gauges thereon. Further purposes, objects, features and advantages of the invention will be evident to those skilled in the art from the following description of an exemplary embodiment of the invention.

BRIEF DESCRIPTION OF THE DRAWING

In the drawing:

FIG. 3 is a top plan view similar to FIG. 1;

FIG. 4 is a sectional view taken along line 4—4 in FIG. 3 showing the relation between a typical stress curve and the location of the strain gauges to monitor the results of such stress;

FIG. 5 is a top plan view showing the tension and compression zones on a different prior art diaphragm;

FIG. 6 is a sectional view taken along line 6—6 in FIG. 5 showing the relation between a typical stress curve and the location of the strain gauges to monitor the results of such stress;

FIG. 7 is a perspective view of a presently preferred embodiment of the improved diaphragm of the present invention;

FIG. 8 is a sectional view taken along the line 8—8 in FIG. 7;

FIG. 11 is a sectional view of the improved diaphragm of FIG. 7 showing the relation between a stress curve and the location of the strain gauges to monitor the results of such stress;

FIG. 12 is a partial sectional view showing a transducer incorporating the improved diaphragm of the present invention; and FIG. 13 is a sectional view taken along line 13—13 in FIG. 12 which also shows an analogous Wheatstone Bridge circuit.

DESCRIPTION OF THE PREFERRED EMBODIMENT

Generally speaking, the chemical milling process is not limited to circular geometry and therefore lends itself to other geometrical patterns more advantageous in achieving an optimized diaphragm construction. In the conventional clamped edge diaphragm the center plane is the neutral zone when pressure is applied within the range of the transducer. (See FIG. 2). The distribution of the tension and compression strain and their amplitudes on the inside surface is well known as shown. The performance problems arise from the fact that it is physically impossible to place the compression gauges at the optimum location (See FIGS. 2 & 4). Other methods and designs have overcome this problem at increased unit cost (See Fig. 5).

Figure 9:
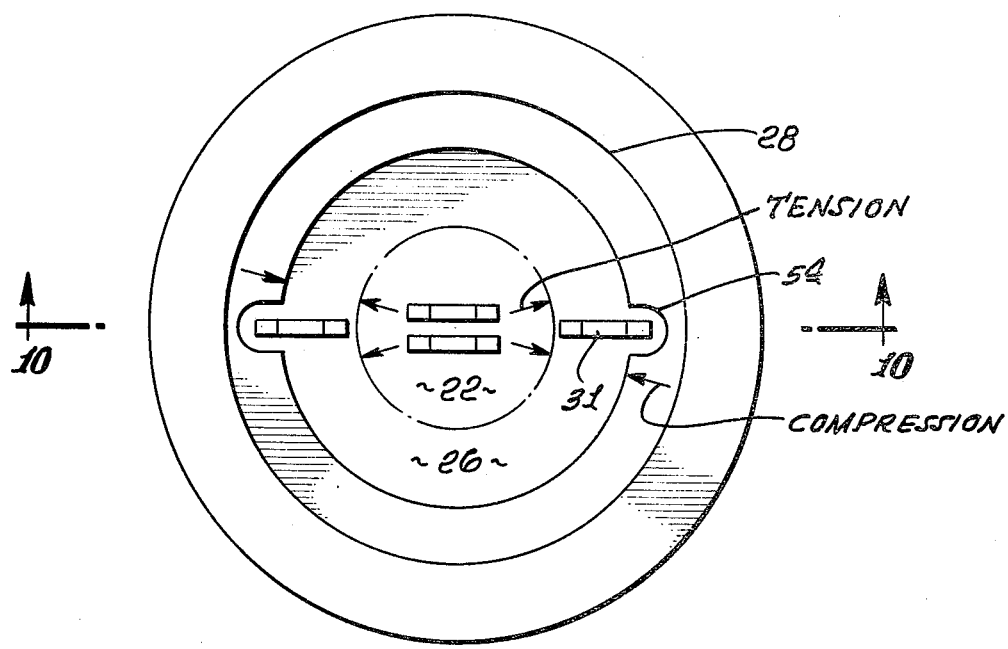
FIG. 9 is a top plan view showing the tension and compression zones on the diaphragm of FIG. 7.
Figure 10:
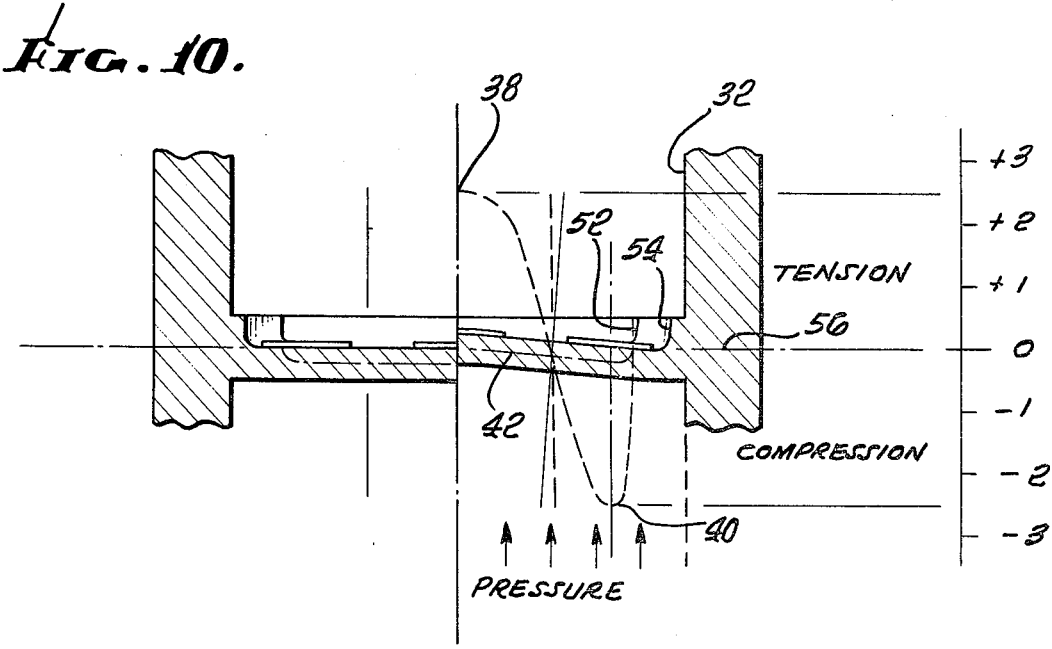
FIG. 10 is a partially schematic sectional view taken along line 10—10 in FIG. 9 showing a stress curve for the improved diaphragm under pressure, superimposed over its actual movement.

Chemical milling (i.e., etching), was discovered to be a unique solution of this problem and at a substantial reduction in cost of manufacturing. Several hundred diaphragms can be milled simultaneously on a single piece of sheet stock of the proper material twice the thickness of the final diaphragm thickness. Known photo lithographic masking techniques are used to generate the dimensions and pattern desired from the applicable blueprint. The outline is etched from both sides to the center plane. The inside of the diaphragm is etched to a diameter 75-80% of the inside diameter of the supporting wall (spacer) to the center plane, and including in the illustrated embodiment two cut-outs at the periphery 180° apart to accommodate one end of each of the compression gauges. (see FIG. 9) Subsequently when the gauges are bonded to the diaphragm, the ends of the compression gauges are then positioned in the neutral zone in the cut-outs near the edge. (See FIG. 10) Through the etching process of the center portion of the diaphragm the center plane is shifted to a new location for that portion of the diaphragm which is in the center plane of the half thickness remaining. (See FIGS. 10 & 11).

The welding process takes place between the etching and the application of the gauges, and is detailed in another pending application entitled Method of Making Diaphragm for Low Pressure Transducers Ser. No. 752,108.

Figure 1:
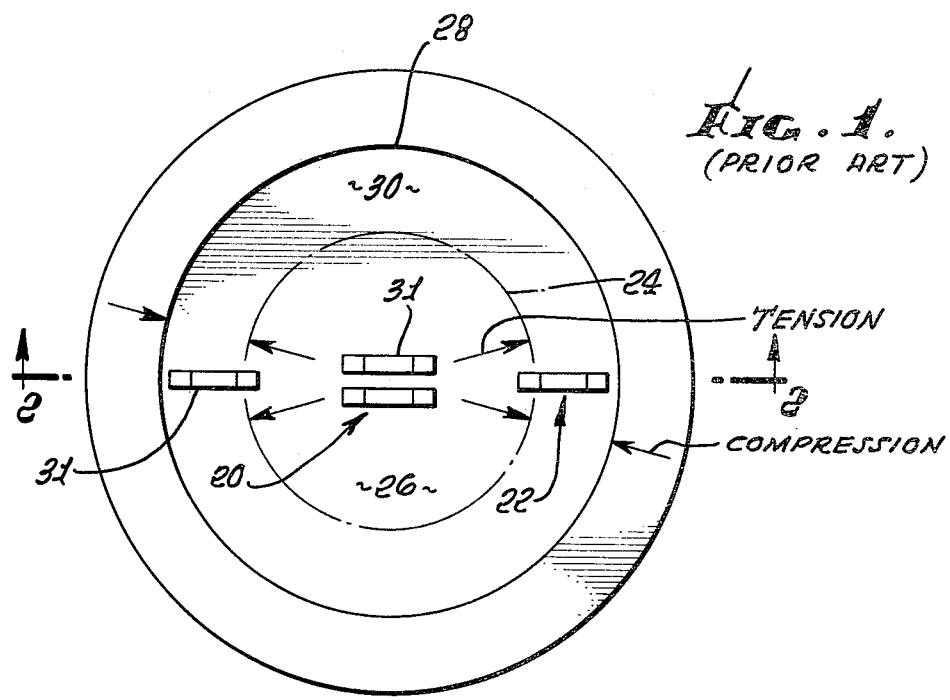
FIG. 1 is a top plan view showing the tension and compression zones on a conventional prior art diaphragm.
Figure 2:
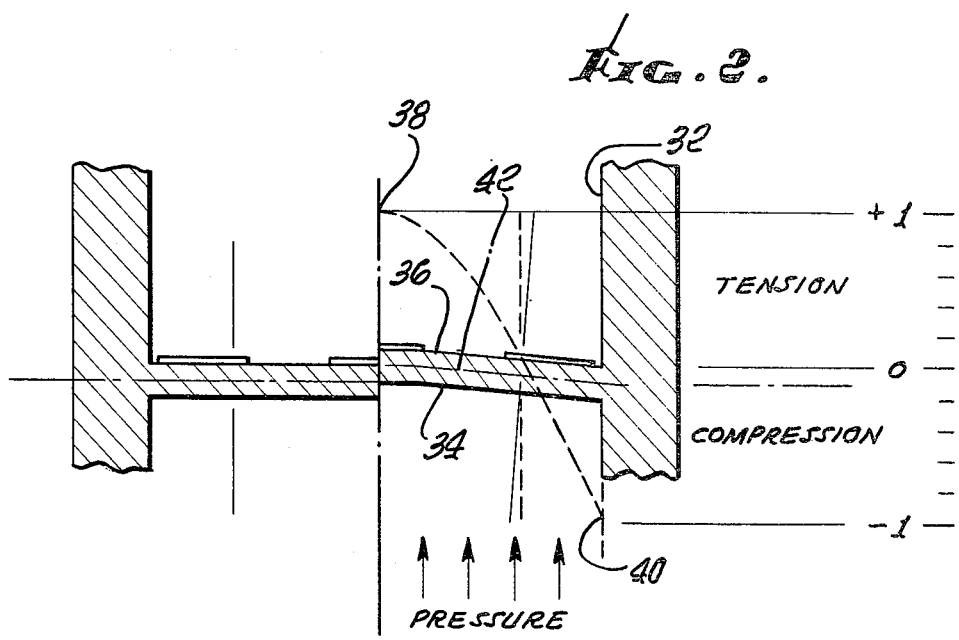
FIG. 2 is a partially schematic sectional view taken along line 2—2 in FIG. 1 showing a typical stress curve for the diaphragm under pressure, superimposed over its actual movement.

Referring more specifically to the drawings, FIG. 1 illustrates a conventional prior art diaphragm plate which includes tensile strain gauges 20 and compressive strain gauges 22 mounted on the rearward surface of the diaphragm plate. More specifically, the tensile strain gauges 20 are mounted inside the boundary line 24 which circumscribes a tension zone 26 in which the diaphragm plate expands when subjected to pressure on the forward face of the plate. A compressive strain gauge 22 is sought to be mounted between line 24 and line 28 which define a compression zone 30 in which the diaphragm plate compresses and contracts when subjected to pressure on the forward face of the diaphragm. The intention (not achieved in the device of FIG. 1 for compression) is to locate the center of sensor portion 31 of the gauge directly over the point of maximum amplitude of either tension or compression, whichever strain characteristic is being measured. An interior spacer wall 32 integral with the exposed portion of the plate therebetween defines the line 28 which is the other boundary of the compressive zone 30. Unfortunately, the spacer wall also serves as a barrier making it impossible to properly locate the compressive strain gauge 22. In other words, as shown in FIG. 2, the application of pressure on a front face 34 the diaphragm creates a strain in the diaphragm plate manifest by the tension on the rear face which reaches a maximum amplitude at point 38, and compression of the plate which reaches a maximum amplitude at point 40 adjacent to the inner spacer wall.

In the conventional modification of FIGS. 5 and 6, a new maximum compression amplitude point 40 is provided by a beveled edge 44 and a thickened spacer wall at 46 to change the usual center plane 42 of the diaphragm plate and enable positioning of the sensor portion 31 of the strain gauge 22 over such maximum stress point.

The present invention provides a similar advantage in a unique way by etching a decreased thickness portion or depression 50 within a boundary 52 which has one or more symmetrically spaced cut-outs 54. This causes a new center line 56 to create a maximum compression amplitude point which can be accurately and precisely monitored by the sensor portion 31 of a strain gauge 22 mounted on the rearward face of the plate and partially extending into the cut-outs or notches offset from the main central portion.

Even though this exemplary embodiment provides for both the compression and expansion strain gauges to be mounted within the depressed portion of the plate, the unique application of the etching technique can be used to provide a multi-layer face on a diaphragm plate in a predetermined pattern such that certain of the sensors could be placed on the raised or thicker portion of the plate.

Also, even though this illustrated embodiment has the monitor spaces on the rearward face of the plate on the side opposite to where the pressure is being exerted, it is within the scope of the invention to mount the strain gauges on the level face of the plate in order to achieve the optimum monitoring position for the gauges.

The last two figures of the drawing illustrate the structural mounting and electrical wiring typically employed with the present invention in combination with the improved plate-monitoring features described above.

It will be appreciated by those skilled in the art that the invention enables the strain gauge sensor to be placed on a diaphragm in an optimum position to measure the action or activity of the diaphragm when it is subjected to pressure directed against one side thereof.

As described, the invention preferably uses two sensors symmetrically positioned relative to the edge of the diaphragm where it connects at its outer boundary in order to accurately monitor the movement of both edges of the diaphragm. Thus, as one portion of the diaphragm contracts while other portions of the diaphragm expand, the invention provides two different ways of accurately measuring the same phenomenon - namely, the pressure being exerted against the surface of the diaphragm. In contrast to conventional construction, it is possible to position the sensors directly over the portions of the diaphragm where maximum contraction and/or maximum expansion occur. In this regard, it is the notches or offsets which have been etched around the periphery of the diaphragm which enables the sensor to be positioned so that the central portion of the sensor directly overlies that part of the diaphragm which has the most flexing movement in terms of maximum compression.

Although an exemplary embodiment of the invention has been disclosed and discussed, it will be understood that other applications of the invention are possible and that the embodiment may be subjected to various changes, modifications, and substitutions without necessarily departing from the invention.

I claim:

1. A method of making an improved transducer diaphragm including the steps of:
    chemically etching one face of a diaphragm plate to chemically mill out a central recess of uniform thickness which constitutes an active portion of the diaphragm displaced below the normal surface of the face to form a plurality of monitor areas peripherally located on the central recess where the diaphragm plate undergoes maximum strain when subjected to pressure, and to chemically mill out recess notches extending from the central recess into the non-active portion of the diaphragm and respectively positioned adjacent each monitor area;

mounting the diaphragm plate on a cylindrical spacer having an interior wall displaced from the outer boundary of the central recess and displaced from the notches; and bonding a strain gauge on the diaphragm plate in each of the notches to directly overlie each of the monitor areas.

2. The method of claim 1 wherein said etching and mounting steps include etching a central recess with a diameter which is substantially 74–80% of the inner diameter of the interior wall of the cylindrical spacer attached to the diaphragm plate by said mounting step.

* * * * *